D. W. MacMILLAN.
SOFT COLLAR FASTENER.
APPLICATION FILED SEPT. 30, 1920.
1,359,612.                                    Patented Nov. 23, 1920.
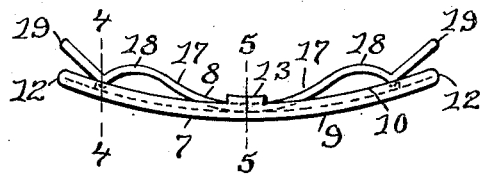
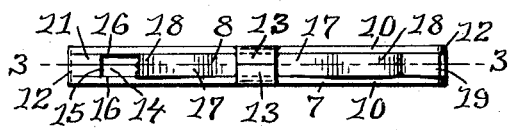
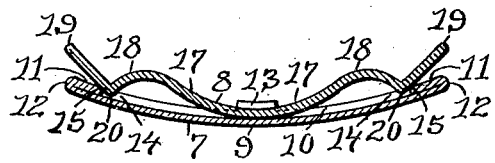
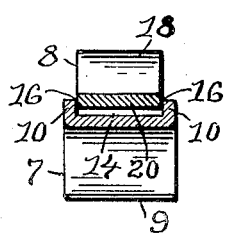   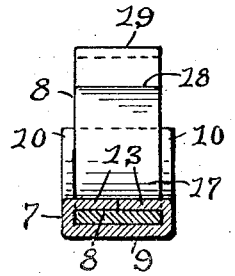
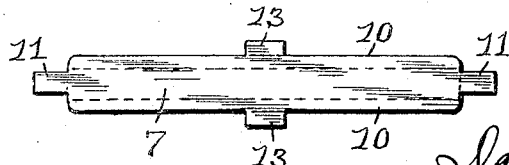
INVENTOR:
Daniel William MacMillan
By Chas. H. Luther
ATTORNEY.

UNITED STATES PATENT OFFICE.

DANIEL WILLIAM MacMILLAN, OF PROVIDENCE, RHODE ISLAND.

SOFT-COLLAR FASTENER.

1,359,612.  Specification of Letters Patent.  Patented Nov. 23, 1920.

Application filed September 30, 1920. Serial No. 413,904.

*To all whom it may concern:*

Be it known that I, DANIEL WILLIAM MACMILLAN, a citizen of the United States, residing at Providence, in the county of Providence and State of Rhode Island, have invented a new and useful Improvement in Soft-Collar Fasteners, of which the following is a specification.

My invention has reference to the art pertaining to jewelry and more particularly to an improvement in soft collar fasteners, used to hold the ends of a soft collar in place.

In the usual construction of soft collar fasteners or holders, the spring construction is fundamentally weak, causing misplacement of the fastener on the collar or loss of the fastener and when metal points are used on the fastener, they are liable to tear or damage the collar.

The object of my invention is to improve the construction of a soft collar fastener or holder, whereby when the fastener or holder is in place on the ends of the collar, the ends of the fastener are gripped to the ends of the collar by a three point spring frictional contact, in each end of the fastener, thereby more firmly and positively securing the fastener to the collar, than has heretofore been done and without injury to the collar.

A further object of my invention is to simplify the construction of soft collar fasteners thereby reducing the cost of manufacturing the same.

My invention consists in the peculiar and novel construction of a soft collar fastener having a three point spring frictional contact in each end and details of construction, as will be more fully set forth hereinafter and claimed.

Figure 1 is an edge view of my improved soft collar fastener in the normally closed position.

Fig. 2 is a back view of the fastener with one end of the spring back bar broken away.

Fig. 3 is a longitudinal sectional view taken on line 3, 3 of Fig. 2.

Fig. 4 is a transverse sectional view taken on line 4, 4 of Fig. 1.

Fig. 5 is a transverse sectional view taken on line 5, 5 of Fig. 1 and

Fig. 6 is a plan view of the blank from which the rigid front bar is formed.

Figs. 1, 2, 3 and 6 are enlarged and Figs. 4 and 5 are still further enlarged.

In the drawings 7 indicates a curved rigid front bar and 8 a spring back bar. The rigid front bar 7 is formed from a blank as shown in Fig. 6, to have a curved front 9, longitudinal edge ribs 10, 10 on the back, folded over flaps 11, 11, on the back at each end, rounded ends 12, 12 and central spring back bar holding members 13, 13 at each side and which are forced over from each side and down onto the back bar, to hold the same in place. The side ribs 10, 10 and the ends of the flaps 11, 11 form a pocket 14 in the back at each end of front bar, each pocket having three point contact edges 15 and 16, 16, as shown in Figs. 2, 3 and 4. The spring back bar 8 is of a width to fit between the edge ribs 10, 10 and is shaped at each side of the back bar holding member 13, 13 to have an outwardly curved spring portion 17 merging into an inwardly curved portion 18 which in turn merges into a straight outwardly bent angular end 19, the curved portion 18 and end 19 forming a heel 20 which enters the pocket 14, as shown in Fig. 3.

By this construction a strong and rigid front bar is produced having smooth rounded ends for easy admission of the collar, the ends of the collar are firmly fastened or clamped between the heels 20, 20, of the spring back bar 8 and the edges 15 and 16, 16 of the pockets 14, 14 thereby more firmly and positively securing the collar fastener to the ends of the collar, without injuring the collar, than has heretofore been done; also as the entire construction consists of two parts only, the cost of construction is reduced to a minimum.

Having thus described my invention I claim as new:

1. A soft collar fastener comprising a front bar having a pocket in the back at each end, each pocket having end and side edges forming three point contact edges, a spring back bar formed to have a heel for each pocket, each heel adapted to enter a pocket adjacent the end of the pocket, for the purpose as described, and means for securing the spring back bar to the front bar.

2. A soft collar fastener comprising a rigid front bar having longitudinal edge ribs and bent over end flaps forming rounded ends and end pockets in the back of the front bar, each end pocket having end and side edges forming three point contact edges, a curved spring back bar formed to have a heel for each pocket which enters the pocket adjacent the end of the pocket, for the purpose as described, and means for securing the spring back bar to the rigid front bar.

3. A soft collar fastener comprising a curved rigid front bar having longitudinal back edge ribs and bent over end flaps forming rounded ends and end pockets in the back of the front bar, each end pocket having end and side edges forming three point contact edges a curved spring back bar formed to have angular ends and a heel for each pocket which enters the pocket adjacent the end of the pocket, for the purpose as described, and means for securing the spring back bar to the rigid front bar, consisting of clamping members on the front bar over the center portion of the back bar, as described.

In testimony whereof, I have signed my name to this specification.

DANIEL WILLIAM MacMILLAN.